(12) United States Patent
Edelson

(10) Patent No.: US 6,198,238 B1
(45) Date of Patent: Mar. 6, 2001

(54) HIGH PHASE ORDER CYCLOCONVERTING GENERATOR AND DRIVE MEANS

(75) Inventor: Jonathan S. Edelson, Princeton, NJ (US)

(73) Assignee: Borealis Technical Limited (GI)

( * ) Notice: Subject to any disclaimer, the term of this patent is extended or adjusted under 35 U.S.C. 154(b) by 0 days.

(21) Appl. No.: 08/568,541

(22) Filed: Dec. 7, 1995

(51) Int. Cl.⁷ ....................................................... A02P 7/66
(52) U.S. Cl. ............................ 318/148; 363/170; 363/175
(58) Field of Search ................................... 318/140–158, 318/798–811; 363/123–139, 157–178

(56) References Cited

U.S. PATENT DOCUMENTS

| | | |
|---|---|---|
| 1,356,933 | 10/1920 | Macmillan . |
| 1,427,360 | 8/1922 | Chubb . |
| 3,584,276 * | 6/1971 | Ringland et al. ..................... 318/171 |
| 3,611,104 * | 10/1971 | Jalal et al. ............................ 318/800 |
| 3,641,417 * | 2/1972 | Gyugyi ................................. 363/160 |
| 3,713,504 * | 1/1973 | Shimer et al. ...................... 180/65.1 |
| 3,832,625 * | 8/1974 | Gyugyi ................................... 322/47 |
| 3,908,130 * | 9/1975 | Lafuze ................................. 318/254 |
| 4,013,937 * | 3/1977 | Pelly et al. .............................. 321/7 |
| 4,023,083 * | 5/1977 | Plunkett ............................... 318/432 |
| 4,093,869 * | 6/1978 | Hoffmann et al. ..................... 290/31 |
| 4,352,155 * | 9/1982 | Gyugyi ................................. 363/163 |
| 4,476,422 | 10/1984 | Kirschbaum . |
| 4,749,933 | 6/1988 | ben-Aaron .......................... 318/810 |
| 4,833,588 * | 5/1989 | Schauder ............................. 318/807 |
| 5,075,610 * | 12/1991 | Harris .................................. 318/701 |
| 5,129,328 * | 7/1992 | Donnelly ............................. 105/61.5 |
| 5,198,972 * | 3/1993 | Lafuze ................................. 363/138 |
| 5,365,158 * | 11/1994 | Tanaka et al. ....................... 318/806 |
| 5,552,640 * | 9/1996 | Sutton et al. ....................... 290/40 B |

OTHER PUBLICATIONS

L.A.Klingshirn "High Phase Order Induction Motors", IEEE Transactions on Power Apparatus and Systems pp. 47–59, Jan. 1993.

M.Abbas, R.Christen, Charateristics of a High–Power Density Six–Phase Induction Motor, 1984.

H.A.Toliyat, T. Lipo, J.C.White, "Analysis of a Concentrated Winding Induction Machine", IEEE Trans.Energy Conversion, pp. 679–692, Dec. 1991.

* cited by examiner

Primary Examiner—David Martin

(57) ABSTRACT

An electrical generator, consisting of a high phase order generator and a high phase order cycloconverter. Output from said cycloconverter may be high phase order, three phase, single phase, or direct current. Output from said cycloconverter may be of arbitrary frequency, voltage, and phase.

Power electronic components are smaller and more efficiently used. Slower and therefor less expensive devices may be beneficially used. Variable speed resources may be used without the use of a DC to DC converter, enhancing power production efficiency.

In a beneficial embodiment of the present invention, said cycloconverter is used to provide power directly to a high phase order motor, whereby diesel electric drive means may be constructed to higher specific power and higher efficiency.

26 Claims, 14 Drawing Sheets

HIGH PHASE ORDER CYCLOCONVERTING GENERATOR AND DRIVE MEANS

BACKGROUND—CROSS REFERENCE TO RELATED APPLICATIONS

The present invention is related to the high phase order motors and generators described in the pending application titled "Poly Phase Induction Electrical Rotating Machine" Ser. No. 08/350,737, filed Dec. 7, 1994, which is a Continuation-in-Part to "Method of Operating an AC Induction Motor via Total Synthesis of Stator Magnetic Field Structure," Ser. No.08/302,090, filed Sep. 5, 1994, now abandoned, which is a further Continuation-in-Part to "Method of Operating Electrical Rotating Machinery via Independent Synthesis to Each Stator Conductor," Ser. No. 08/267,043, filed Jun. 28, 1994, now abandoned. The present invention is further related to the application titled "Method for Operating a Polyphase AC Induction Motor", Ser. No. 08/258,561 filed Jun. 10, 1994.

BACKGROUND

1. Field of Invention

The present invention is related to the field of electric power production and consumption. The present invention is further related to field of power electronics and power conversion systems involving AC frequency change.

2. Background—Prior Art

Methods for the interconversion of electrical power at a given input voltage, current, and frequency, to electrical power at a different output voltage, current, and frequency are well known in the art. The simplest device for such interconversion is the common transformer, which may be used to trade voltage for current with little loss of power to inefficiency. A transformer is not capable of altering the frequency of the power delivered to the load, and is not capable of functioning with DC power input.

More complex systems for power interconversion are capable of changing frequency and dealing with DC power input. The earliest such devices were motor/generator pairs and synchronous converters. These devices converted the input electrical power into an intermediate mechanical form, and then converted the mechanical power back into electricity. An AC induction motor, for example would act as the prime mover for a DC generator, thus allowing AC mains power to be converted to DC power. Similar devices may be used for frequency conversion.

Advances in semiconductor technology have made the field of power electronics viable for applications over a wide range of power levels. Power electronics is the application of electronic switching devices such as transistors to problems of power interconversion. Efficiency is of paramount importance in power electronic applications, in contrast to signal level electronics, in which fidelity of signal reproduction is of greater import.

The basic element found in power electronics applications is the switching element. An ideal switching element is either on, meaning that it has zero resistance, or off, meaning that it passes zero current. The transition between on and off in the ideal element is instantaneous. An ideal switching element would dissipate no power, either passing current without loss, or preventing the flow of current entirely. Again, this may be contrasted to signal electronics applications wherein active devices are operated in the linear mode, and therefore must dissipate power. Currently available semiconductor devices for the switching element approach ideal capabilities very well; a single transistor, which because of a slight imperfection must dissipate 10 watts of power as heat, may be capable of controlling several hundred watts of power delivered to a load.

Power dissipation in the switching elements may be divided up into several processes. Conduction loss is loss that occurs when the device is on. Conduction loss is similar to resistance loss; when current flows through a bulk material there is a slight voltage drop, which is accompanied by heat generation. Drive loss is the electrical power required to control the switching element. In something like a bipolar transistor, drive loss may be considerable. Switching losses are losses that result from current being carried during the transitional state between on and off or off and on. During this transitional state, the switch appears to be a high resistance, but considerable current may be carried. Often, switching losses, in particular, turn-off losses, account for the majority of the total losses of an operating device. Simply operating devices more slowly can substantially increase efficiency.

The simplest of the power electronics power converters to understand is the pulse width modulated DC controller, or chopper. This device is simply a switch element placed in series with a load and connected to a source of DC power. The switch element is switched on and off at a rapid rate. By varying the duty cycle of the switching element, i.e., by changing the ratio between 'on' state and 'off' state, the power delivered to the load may be varied. The variable duty cycle switching element acts as a variable resistance, without dissipating power in the fashion of an actual resistor. Though use of suitable filtering components such as inductors and capacitors, the pulsing nature of the DC power delivered to the load may be eliminated, and a smooth variable DC voltage may be delivered to the load. Additionally, such filter components allow one to trade current for voltage, and allow for output voltages greater than the input voltage. The latter device is known as a switch mode power supply or DC to DC converter. For many power applications, such as resistance heaters or lighting applications, pulsing DC is acceptable and the controller is simple in the extreme.

Of similar complexity is the SCR controller. The Silicon Controlled Rectifier, or SCR, is one of the oldest power electronic components, the semiconductor analog of the thryatron gas discharge tube. SCR devices are available with current capacities in the thousands of amperes and voltage ratings in the thousands of volts, meaning that a single device can switch many megawatts of power. The primary difficulty involved in the use of the SCR is that it is not self-commutating. Once an SCR is turned on by the application of a control pulse, it does not turn off. In order to commutate an SCR, the current flow must be stopped externally. Once current has ceased to flow, the SCR will 'turn-off', and will prevent current flow until the application of the next control pulse.

SCR devices may be used to great advantage when controlling AC current flows, wherein the flow of current necessarily stops and reverses twice with each AC cycle. The natural cessation of current may be used to commutate the SCR switch.

An SCR device may be used to control the power delivered to a load as follows: the SCR is connected in series with the load to a source of AC power. It is controlled by a device which is capable of triggering the SCR at a variable time after the beginning of the AC cycle; such devices are commonly called 'cosine firing circuits'. If the SCR is triggered at the beginning of the AC cycle, then the SCR conducts for the entire half-cycle until the current flow reverses. The full power of the first half-cycle is delivered to the load. If the SCR is triggered near the end of the first half-cycle, then very little power is delivered to the load. The addition of a second SCR allows the second (negative going) half-cycle of the AC waveform to be similarly used. Thus through the use of two SCR devices and a simple delay circuit, control of the AC power delivered to a load is achieved. Packaged devices operating on this principal are used in home lighting dimmers and small motor controls.

Both the DC chopper and the AC SCR based controller may be used to produce an AC power output. Such output may be of use in supplying power to a conventional power distribution system, or for the operation of a motor requiring AC power input. Roughly, the methods described above are used, but the control circuitry is additionally used to vary the output in the same fashion that the desired AC output varies. In order to produce the desired output with reasonable fidelity, the pulse rate of the switching device must be of a higher frequency than the desired output frequency. A device which converts DC input power into an AC output in this fashion is commonly called an inverter.

Well known in the art is a device which consists of a rectification section for the production of DC power from input AC power, combined with a three phase inverter system for the production of AC. This AC power is then used to operate an AC motor. The benefit of a so called DC link converter is that the output AC power is of arbitrary and variable frequency and voltage, thus providing substantial control of motor operations. Such devices allow for control of motor synchronous speed, and with appropriate feedback devices can control the motor based upon speed, torque, acceleration, or other factors.

Also well known in the art is the cycloconverter. This is an SCR based converter for producing a polyphase AC output from a polyphase AC input. Commonly, this is a three phase device.

Background—Fidelity of AC Power Output

As stated above, the synthesized AC output from either the DC to AC inverter or the cycloconverter is composed of pulses, which approximate the desired AC output. The closeness of this approximation is enhanced by a greater number of pulses per AC output cycle. The error introduced by the pulsed nature of the inverter output exhibits itself in the form of harmonic distortion of the output waveform. Such harmonics, or high frequency components of the output, can degrade motor operation, cause overheating in power line transformers, cause excessive ground currents to flow, and lead to interference of other services. As the pulse rate is increased, the frequency of the harmonic distortion increases. The effect upon motors is reduced, and the ease with which the harmonics can be filtered is increased. Increasing pulse rate to enhance fidelity of the synthesized waveform thus has many advantages well known in the art.

Background—High Phase Order Machinery

Conventional AC electrical rotating machinery is either three phase or single phase in nature. Single phase systems are used for small applications, such as blowers, small power tools, and the like. Three phase systems are invariably used for applications of power ratings above about 5 horsepower. Archaic systems dating from the earliest polyphase electrification may use two phase machinery. The three phase power distribution system is a standard with many practical advantages.

However, the term encountered in the art for describing the three phase devices is 'polyphase electrical rotating machines'. Furthermore, study of the mathematical equations which describe such machines shows that any number of phases may be used, and that the standard equations used for the design of electrical rotating machinery may be used for phase counts other than three. The substantial benefit to be had with the use of high phase order machines has been unrecognized until recently. 'High phase order' is a term used in the art to describe alternating current of four or more phases as differentiated from the term 'polyphase' which is normally used in the art to describe current of two or three phases despite its literal meaning of many phases.

High phase order machines are quite unknown in the industry, and have been the subject of comparatively few academic papers. High phase order induction machines are not present as specific embodiments in the US patent database, with high phase order brushless DC motors being only recently disclosed.

The only essential difference between a high phase order machine and a conventional three phase machine is that the number of independent phase windings in the stator (or as may be appropriate, rotor) is substantially greater than three. High phase order electrical rotating machinery makes use of similar laminations and frames, uses similar production techniques, similar inverter technology, similar materials, and provides similar services to those of three phase machines. Despite these similarities, the HPO design has numerous advantages over three phase machines.

1) Winding distribution factor is nearly unity. In conventional three phase machines, each phase must be applied to several windings which subtend a quite large region of the stator. The magnetic field produced by the coil at one side of this region is somewhat canceled by that of the coil at the opposite side of the region, thus reducing the effectiveness of the coils, and lowering the impedance. As a result, more turns of wire are needed to properly limit current flow and flux density. This larger number of turns means that the current must flow through a longer wire, while at the same time forcing the wire to be thinner in order to fit into the stator slots. The distribution factor necessitated by the use of three phase power lowers the efficiency of the machine by increasing resistance losses in the windings. High phase order machines may be wound with concentrated windings, eliminating these problems.

2) High phase order machines tolerate drive harmonics. In a conventional three phase machine, harmonics in the drive waveform excite rotating fields which rotate at different speeds than the fundamental rotating field. These rotating fields are a source of inefficiency. This sensitivity to harmonics is especially important when inverter drives are used, because of the generally high harmonic content of the inverter output. Concentrated winding HPO machines harness the odd harmonic currents up to twice the number of phases, thus substantially reducing the losses induced by harmonic inputs. Less expensive inverter technology may be used to drive HPO systems.

3) High phase order machines tolerate air gap harmonics. In a conventional three phase machine, air gap harmonics can lead to torque ripple and reduced starting torque, and in pathological situation can cause a machine to lock into a low speed operational mode. In order to avoid air gap harmonics, three phase machines must be wound with chorded windings, that is windings which do not span 180 electrical degrees. This chording introduces a similar loss to the distribution factor, and thus reduces the efficiency of the machine in order to improve functionality with three phase power. HPO machines harness air gap harmonics, and thus may use full span windings, reducing this loss. HPO machines may also be operated at high saturation levels without difficulties being induced by saturation air gap harmonics, thus increasing overload capabilities.

4) High phase order inverter electronics makes use of a large number of comparatively small active devices. Such devices are often less expensive per unit power handling capability. Harmonic tolerance means that lower pulse rates may be used, and thus slower active devices, again a cost savings. Finally, the large number of active devices results in enhanced reliability.

Thus, for situations where long distance power transmission is not a factor, high phase order systems will be substantially more capable. Specifically, inverter driven motors wherein three phase power is converted to suitable high phase order power are a very attractive replacement for current devices.

Background—Diesel Electric Drive

A common device in the art is the diesel electric drive system. This device consists of a heat engine, generally a diesel internal combustion engine, a generator, a controller, and a motor. Mechanical power produced by the combustion of fuel is converted to electricity, which then goes to power the motor. The output of the motor is then coupled to wheels or other drive means.

This is an indirect process as compared to the direct coupling of mechanical power to the wheels. The benefits of this indirect process lies in the fact that commonly used heat engines do not function effectively at zero speed. In accelerating large inertial loads such as trains, one finds large torque requirements during low speed operation. Mechanical coupling via a transmission and clutch or torque converter would be heavy, expensive, inefficient, and subject to extreme wear. Thus indirect coupling via a generator and a controller is used.

Often the above system makes use of DC drive motors, although AC systems are entering production and use.

The benefits of these diesel electric drives are well known in the art. For other traction drive applications, still further benefits are known. For example, in mining trucks an independent motor can be placed at each wheel, providing four wheel drive with enhanced control of each wheel, a substantial improvement over the use of mechanical differentials.

BRIEF DESCRIPTION OF THE INVENTION

The present invention comprises a high phase order generator directly connected to a high phase order cycloconverter. Said cycloconverter is used to manipulate the output of said generator, the system producing electrical output of the desired voltage, current, frequency, and phase. In a particularly beneficial embodiment of the present invention, said cycloconverter may additionally be connected to a high phase order motor, allowing for controlled mechanical output through the manipulation of said electrical output.

The present invention distinguishes over the prior art in the use of high phase order technology rather than three phase technology. Novel modifications to the three phase technology, beyond the use of additional phases, provide benefits to machine operation unforeseen in the prior art.

The present invention may be used to produce electrical output of fixed frequency and voltage from a variable frequency input. This would be used for the production of mains electricity from a variable resource, such as wind power. The present invention may be used to produce variable electrical output from a fixed frequency input, as in motor control applications. The present invention may be used to transform a variable electrical input into a different variable electrical output, as in diesel-electric drive applications. The present invention may further be used for the production of fixed frequency electrical output from a fixed frequency electrical input.

OBJECTS AND ADVANTAGES

Accordingly, in addition to the objects and advantages of the HPO cycloconverting generator described above, several objects and advantages of the present invention are the following:

It is an object of the present invention to provide means by which a fixed or variable frequency AC power output may be produced from a fixed or variable frequency generator without an intermediate DC stage, and without requiring a high frequency from the input side.

An advantage of the present invention is that losses associated with the rectification step are avoided, improving efficiency and reducing costs.

An advantage of the present invention is that lower frequency components may be used, reducing system costs.

It is an object of the present invention to provide a novel and beneficial use for HPO electrical rotating machinery.

An advantage of the present invention is that the use of efficient HPO generators and motors is facilitated.

An advantage of the present system is the inclusion of the fault tolerance of HPO systems. Failure of a single phase in an HPO motor or generator is a minor problem as compared to the results of a similar failure on a three phase device.

It is an object of the present invention to provide an efficient system which may make use of slower, more efficient power devices.

An advantage of the present invention is that robust, inexpensive devices such as the SCR may be used to replace other, considerably more expensive, transistors.

An advantage of the present invention is that each individual active device may be reduced in power capability. Owing to economies of scale, such devices are often of lower cost per unit power handling capacity.

Additional objects and advantages will become apparent as the subject invention becomes better understood by reference to the following detailed description when considered in conjunction with the accompanying drawings.

LIST OF DRAWINGS

Figure 1:
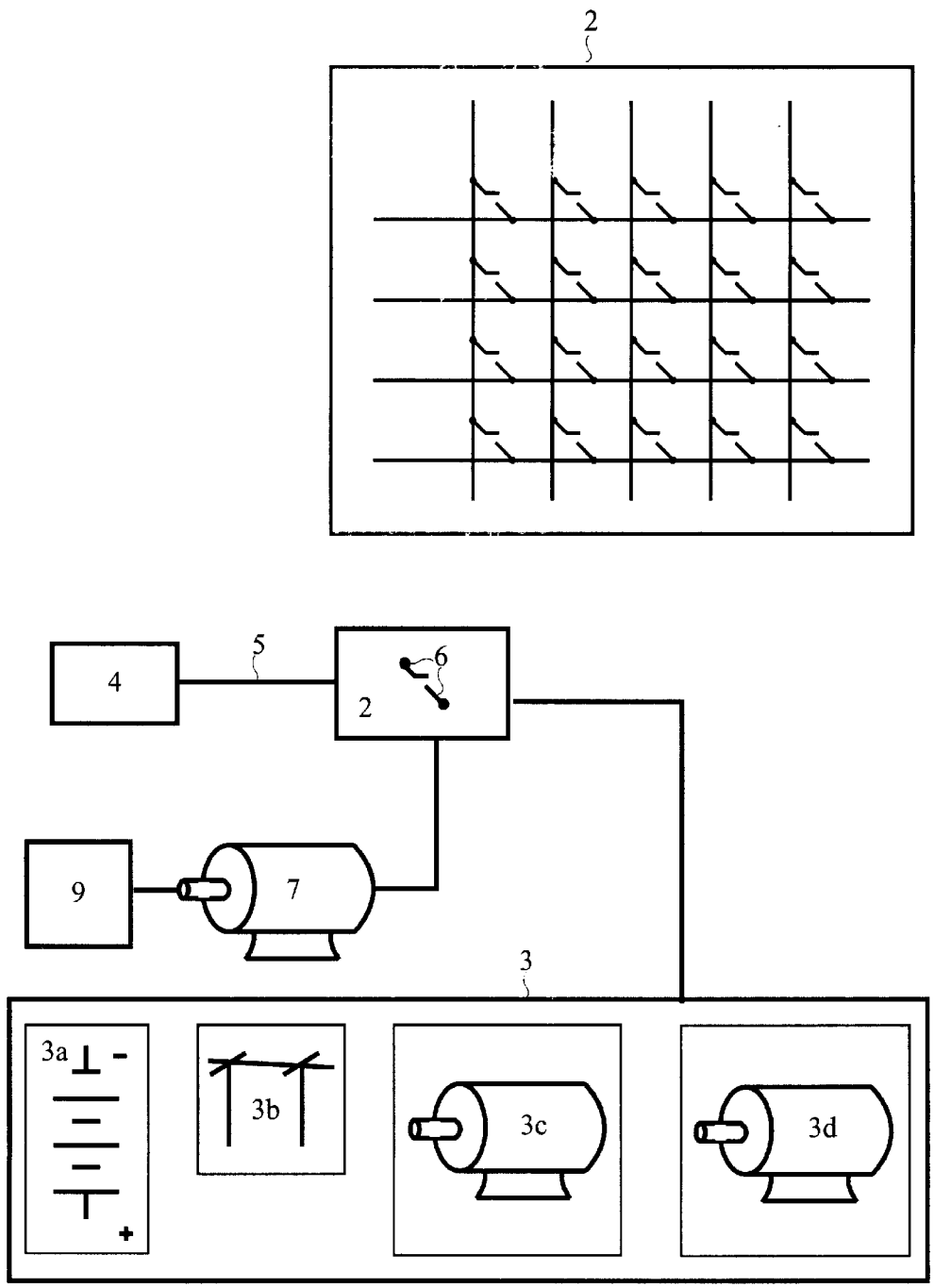
FIG. 1 is an overview schematic the high phase order cycloconverting generator of the present invention.

DESCRIPTION OF REFERENCE NUMERALS 1 high phase order supply
2 switching matrix
3 electrical load
4 control system
5 control signals
6 switching elements
7 high phase order generator
8 high phase order motor
9 prime mover
10 mechanical load
11 stator
12 windings
13 insulated wire
14 slots
15 rotor
18 shaft
19 magnetic field
20 windings
23 source of alternating current
24 controller means
26 voltage transducer means
27 gate terminal
28 power terminals
29 power switch

DESCRIPTION OF INVENTION

In order to facilitate disclosure of the present invention, the entire system will initially be described in terms of generic elements. Following this, descriptions of the individual elements will be made, then particular reference will be made to the enhancements facilitated by the unique features of the present invention.

Referring to FIG. 1, a prime mover 9 is connected via suitable coupling means for the carriage of mechanical power in the form of rotary motion to a high phase order generator 7. Said generator 7 is connected via suitable wiring means for carrying electrical current to a switching matrix 2. Said switching matrix 2 is further connected via suitable wiring means for carrying electrical current to a load 3, said load 3 being a direct current load 3a, a single phase load 3b, a polyphase load 3c or a high phase order load 3d. A control system 4, is connected via suitable means for carrying control signals 5 to a plurality of switching elements 6 which comprise said switching matrix 2.

The operation of the apparatus disclosed in FIG. 1 is as follows. Said prime mover 9 is operated in the conventional fashion, producing mechanical power in the form of rotary motion. Said prime mover 9 may be any source of rotary motion, including but not limited to wind turbines, internal combustion engines, external combustion engines, steam turbines, water turbines, gas turbines, flywheels, hamster wheels, planetary angular momentum, etc. Said mechanical power from said prime mover 9 is converted into electrical power by said high phase order generator 7. Said electrical power is then converted, by said switching matrix 2, into electrical power of another format, suitable for use by load 3. Said conversion of electrical power is further detailed below.

Figure 2:
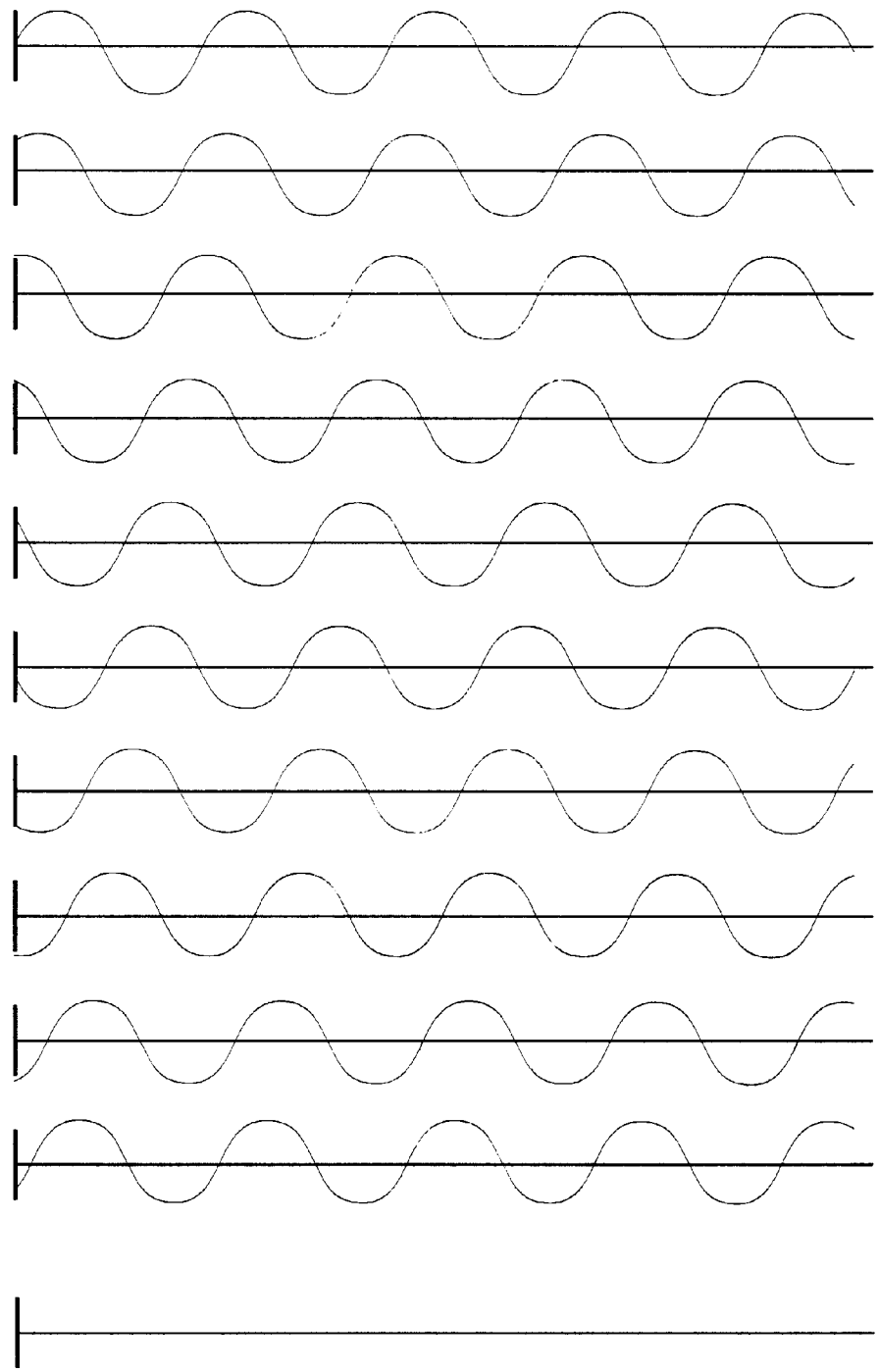
FIG. 2 is a representation of the output of the high phase order generator.

FIG. 2 is a representation of the electrical output of high phase order supply 1. In this representation, each graph represents the electrical output of an individual phase of high phase order supply, with the abscissa of each graph representing time and the ordinate of each graph representing voltage, using arbitrary units. FIG. 2 embodies a specific number of phases and displacement between phases; however any number of phases are certainly possible, and other displacements between phases may be used.

Figure 3:
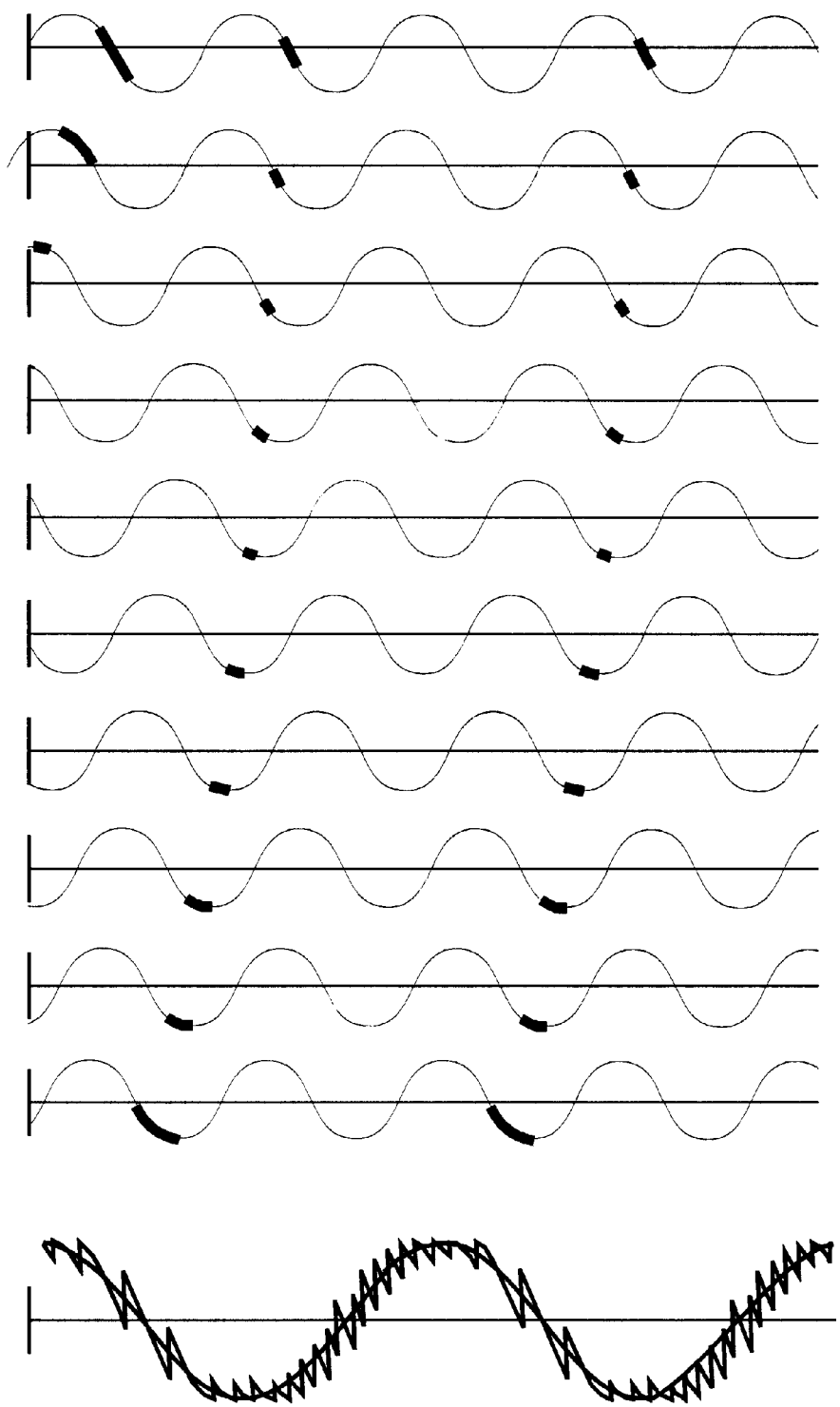
FIG. 3 is a representation of the production of a single output phase of electrical power using as the input the high phase order electrical power represented in FIG. 2 via the high phase order cycloconverter.

Referring to FIG. 3, a single phase of output electrical power is produced from the high phase order electrical power represented in FIG. 2. The top graphs of FIG. 3 represent the input electrical power, whilst the bottom graph of FIG. 3 represents the unfiltered output of a single phase from switching matrix 2. As indicated in FIG. 1, each output phase of switching matrix 2 is connected to each input phase via switching elements 6. The operation of individual switching elements 6 is indicated by the use of shading. A shaded section represents a conduction situation wherein switching element 6 connects the corresponding input phase to the output phase. As may be seen from FIG. 3, each input phase is electrically connected in turn to the output phase by means of switching elements, producing an output waveform which is a composite of the input phases, said output waveform having characteristics defined by control system 4.

Figure 4:
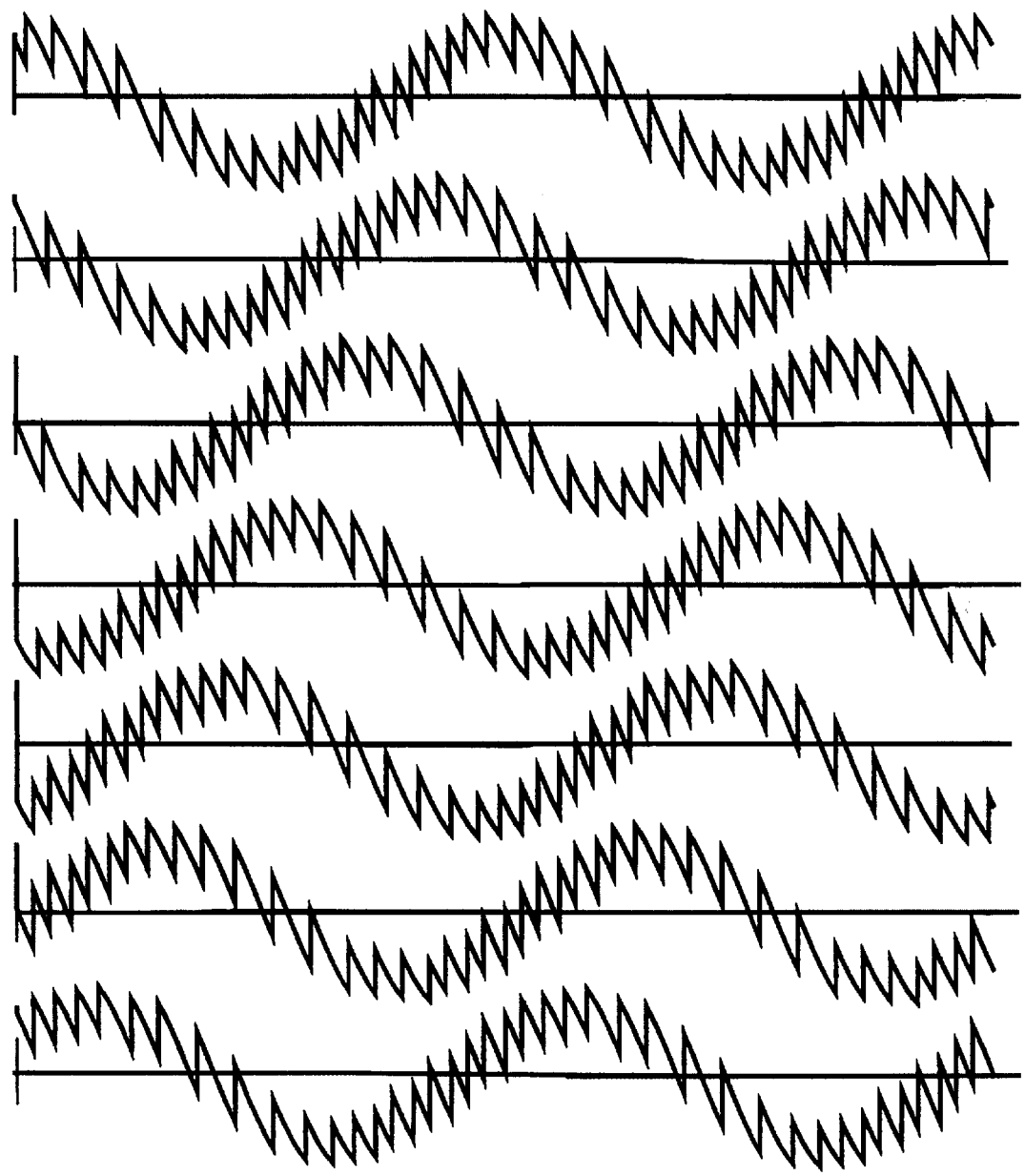
FIG. 4 is a representation of the multiple phase output produced by the present invention

FIG. 4 is a representation of the multiple phase output produced by switching matrix 2. Each output phase is produced in the fashion of the single phase represented in FIG. 3.

Figure 5:
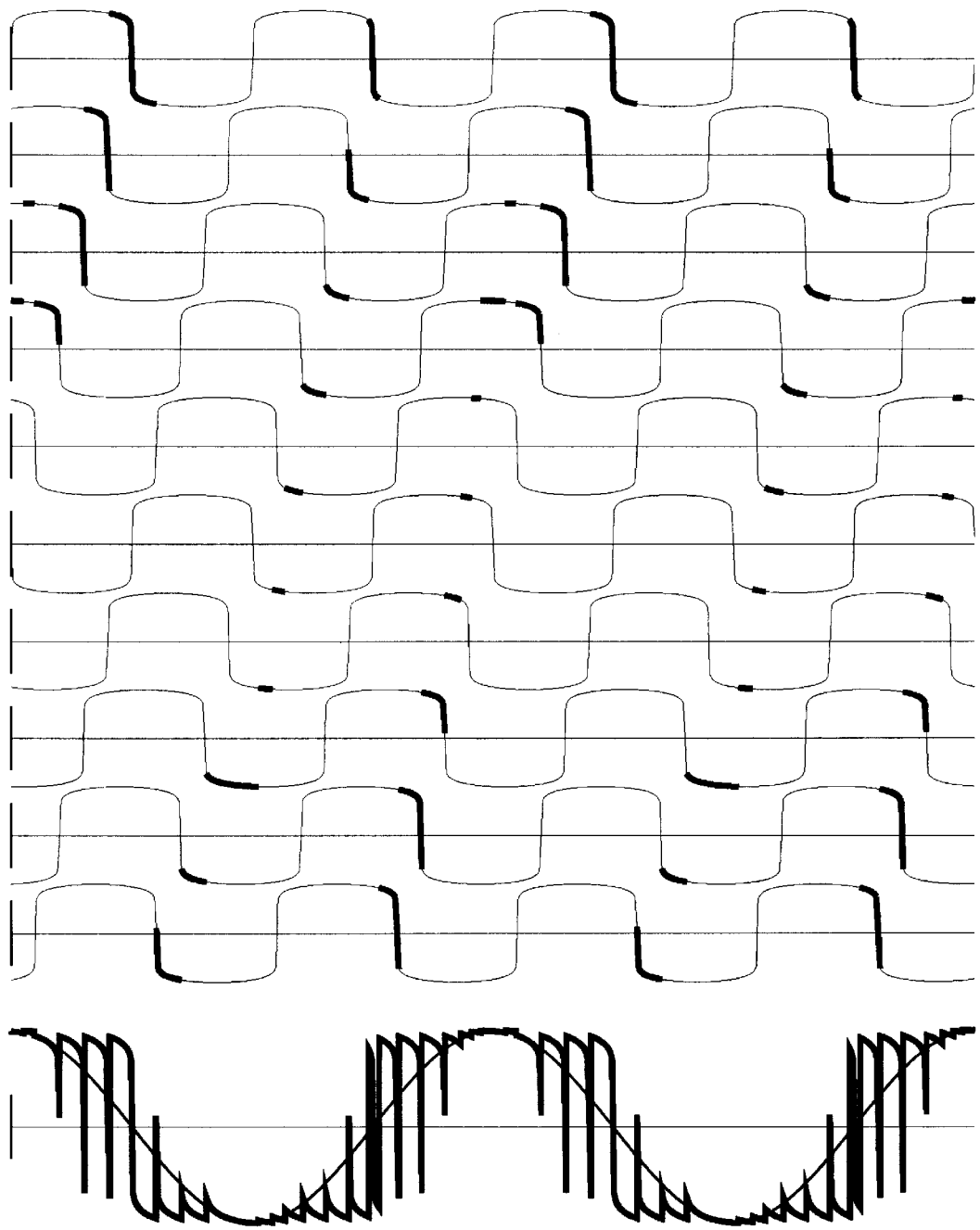
FIG. 5 is a representation of the production of a single output phase of electrical power using as the input a nominally square-wave polyphase input.

The present invention is not limited to sine-wave operations, normally encountered in the operation of alternating current rotating machinery. The implementation of the present invention so as to use non-sinusoidal waveforms is a particular advantage facilitated by the use of high phase order components. Referring to FIG. 5, a square-wave high phase order input is used to generate a square wave output. FIG. 5 is analogous in every respect to FIG. 3. The top graphs of FIG. 5 represent the input electrical power, whilst the bottom graph of FIG. 5 represents the unfiltered output of a single phase from switching matrix 2. As indicated in FIG. 1, each output phase of switching matrix 2 is connected to each input phase via switching elements 6. The operation of individual switching elements 6 is indicated by the use of shading. A shaded section represents a conduction situation wherein switching element 6 connects the corresponding input phase to the output phase. As may be seen from FIG. 5, each input phase is electrically connected in turn to the output phase by means of switching elements 6, producing an output waveform which is a composite of the input phases, said output waveform having characteristics defined by control system 4.

Figure 6:
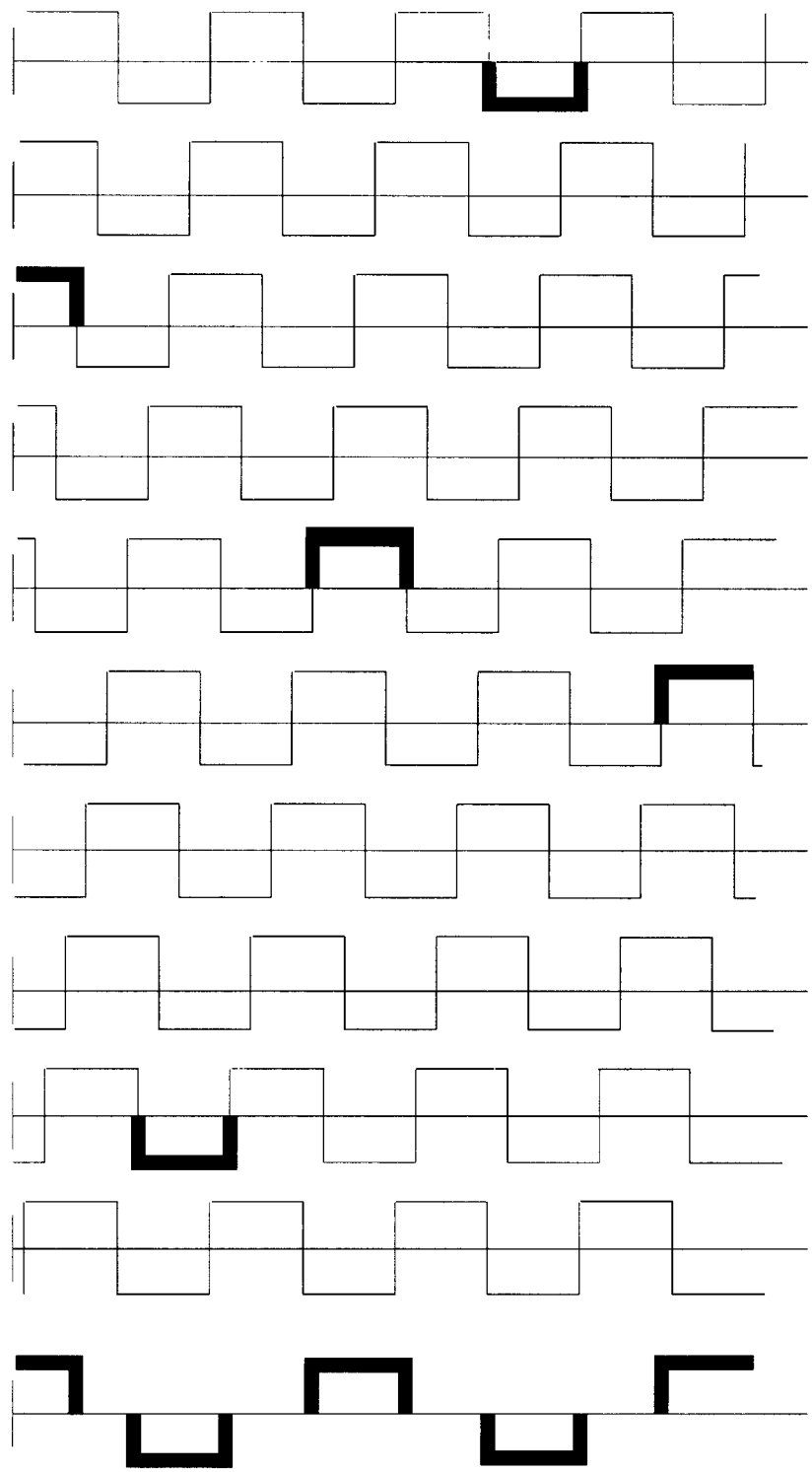
FIG. 6 is a representation of the production of a single output phase of electrical power using as the input a nominally square-wave polyphase input, said output being composed of entire pulses switched from said input.

A further mode of operation particularly facilitated by the use of high phase order components, is the use of zero-current switching in order to switch entire cycles from said high phase order supply 1 to said high phase order motor 8. In this fashion, switching losses may be substantially reduced to zero. Referring to FIG. 6, a square-wave high phase order input is used to generate a square wave output. FIG. 6 is analogous to FIG. 5, the essential difference being that said switching elements 6 are caused to switch only at zero current flow, whereby entire pulses are switched from each input phase to each output phase. While switching losses may be reduced by means of such zero current switching, and while average current will remain constant as compared to the switching paradigm given in FIG. 5, instantaneous current in any given said switching element 6 may be increased, thus necessitating engineering tradeoff of losses.

Figure 7:
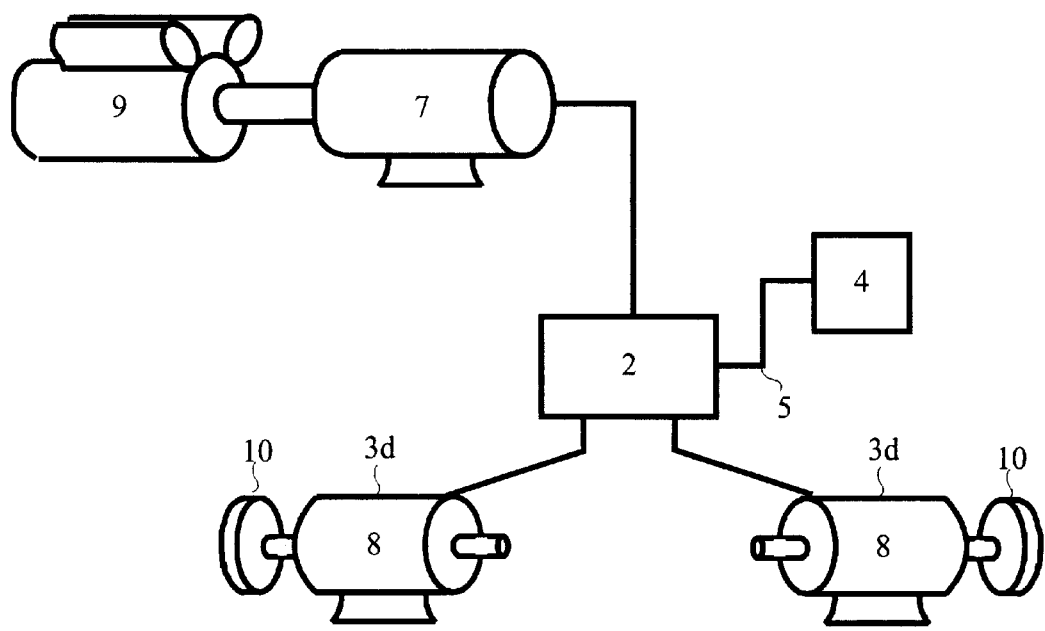
FIG. 7 is an overview schematic of a diesel electric drive system.

With reference to FIG. 7, we see a diesel electric drive system. Prime mover 9 is connected via suitable coupling means for the carriage of mechanical power in the form of rotary motion to a high phase order generator 7 which constitutes said high phase order supply 1. Said high phase order generator 7 is further connected via suitable wiring means for carrying electrical current to said switching matrix 2. Said switching matrix 2 is further connected via suitable wiring means for carrying electrical current to a high phase order motor 8, said motor 8 constituting said high phase order load 3d. Said control system 4, is connected via suitable communications means for carrying said control signals 5 to said plurality of switching elements 6 which comprise said switching matrix 2. Said motor 8 is connected via suitable mechanical coupling means to a mechanical load 10. A plurality of motors 8 may be used in vehicular drive applications.

Operation of the diesel electric drive system described in FIG. 7 is as follows: said prime mover 9 is operated in the conventional fashion to produce rotary motion. Said rotary motion is a form of mechanical power. Said rotary motion is coupled to said high phase order generator 7. Thus said generator 7 constitutes a load on said prime mover 9, converting mechanical power into high phase order electrical power. Said high phase order electrical power is then passed through said switching matrix 2, converting said high phase order electrical power into electrical power of different frequency, phase, voltage, and/or waveform. Said electrical power is transformed by the operation of said switching matrix 2 in a fashion dictated by said control system 4. Said electrical power, as transformed by said switching matrix 2, is then coupled to said high phase order motor 8. Said motor 8 converts said electrical power into rotary motion, supplying mechanical power to said mechanical load 10.

Said prime mover 9, a source of mechanical power, is thus coupled to said mechanical load 10. The benefit of the indirect method and apparatus described above is well known in the art. The above apparatus serves the purpose of the drive train, transmission, and clutch. While common prime movers such as internal combustion engines working on the Diesel or Otto cycle are incapable of functioning at zero speed, electric motors produce torque at zero speed and can even provide negative speed torque, meaning that the torque is directed in the opposite direction of the rotational velocity. The above apparatus and method is especially useful for starting inertial loads as well as being especially suited to traction applications involving regenerative braking and active braking. The improvement over the prior art lies in the use of high phase order components, allowing for greater efficiency in the transformation of input power to output power, as well as smaller system size for a given power handling capability.

Figure 8:
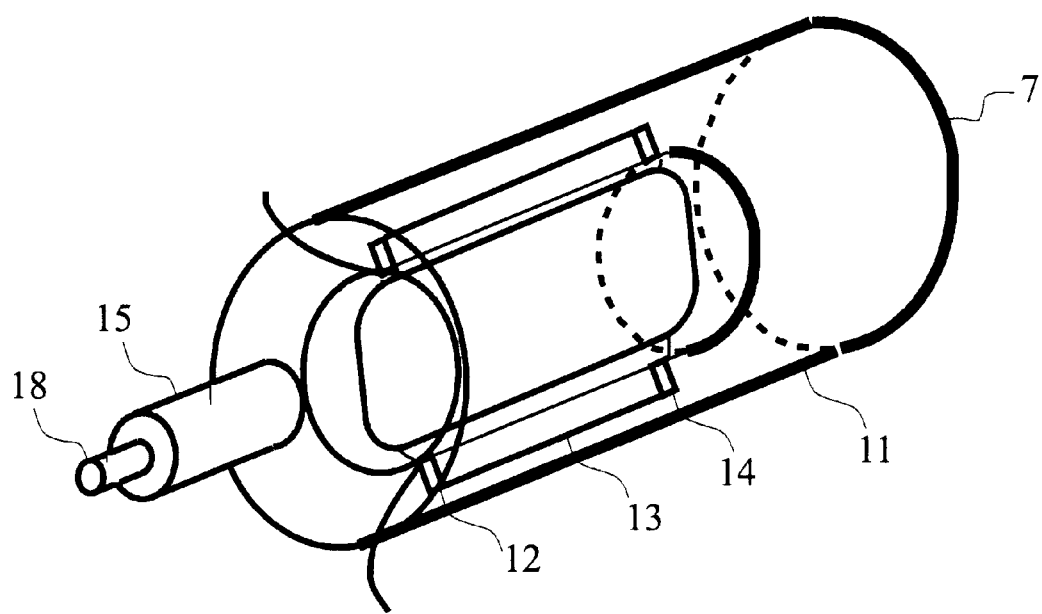
FIG. 8 is a schematic view of a high phase order synchronous generator.

With reference to FIG. 8, we see a representation of a high phase order synchronous generator. Said high phase order synchronous generator is a specific instance of high phase order generator 7. A stator 11 is wound with a plurality of windings 12. Said stator 11 is wound in the conventional fashion, with said windings 12 being composed of loops of insulated wire 13 placed in slots 14 in said stator 11. Said windings 12 may alternatively be composed of other conductive forms in place of insulated wire 13, for example a large machine might make use of insulated conductive bars, or form-wound coils may be used. Such variation is common in the art of conventional machines. A rotor 15 is positioned within said stator 11, supported by suitable bearing means so as to be held in position whilst being allowed to turn freely. Said bearing means generally consists of endbells, said endbells supporting ball bearing cartridges, said bearing cartridges supporting a shaft, said shaft supporting said rotor 15.

Said stator 11, said rotor 15, said bearing means, said endbells, and said shaft 18 are all common in the art. Standard variations, such as the use of thrust bearing means for support in axial loading conditions, water cooling, insulating materials, and the like are not disclosed as being common and well understood in the art. Additional fixtures may be associated with a rotating machine, such an mounting points or air vents. Said fixtures are also common in the art, and not disclosed herein.

Said rotor 15 produces a magnetic field 19. Said magnetic field 19 passes through said stator 11 as well as through the surface described by said windings 12. Said rotor 15 may include windings 20 and slip rings for said production of magnetic field 19, as is common in the art. Said rotor 15 may alternatively include permanent magnets for said production of magnetic field 19, as is common in the art.

Figure 9:
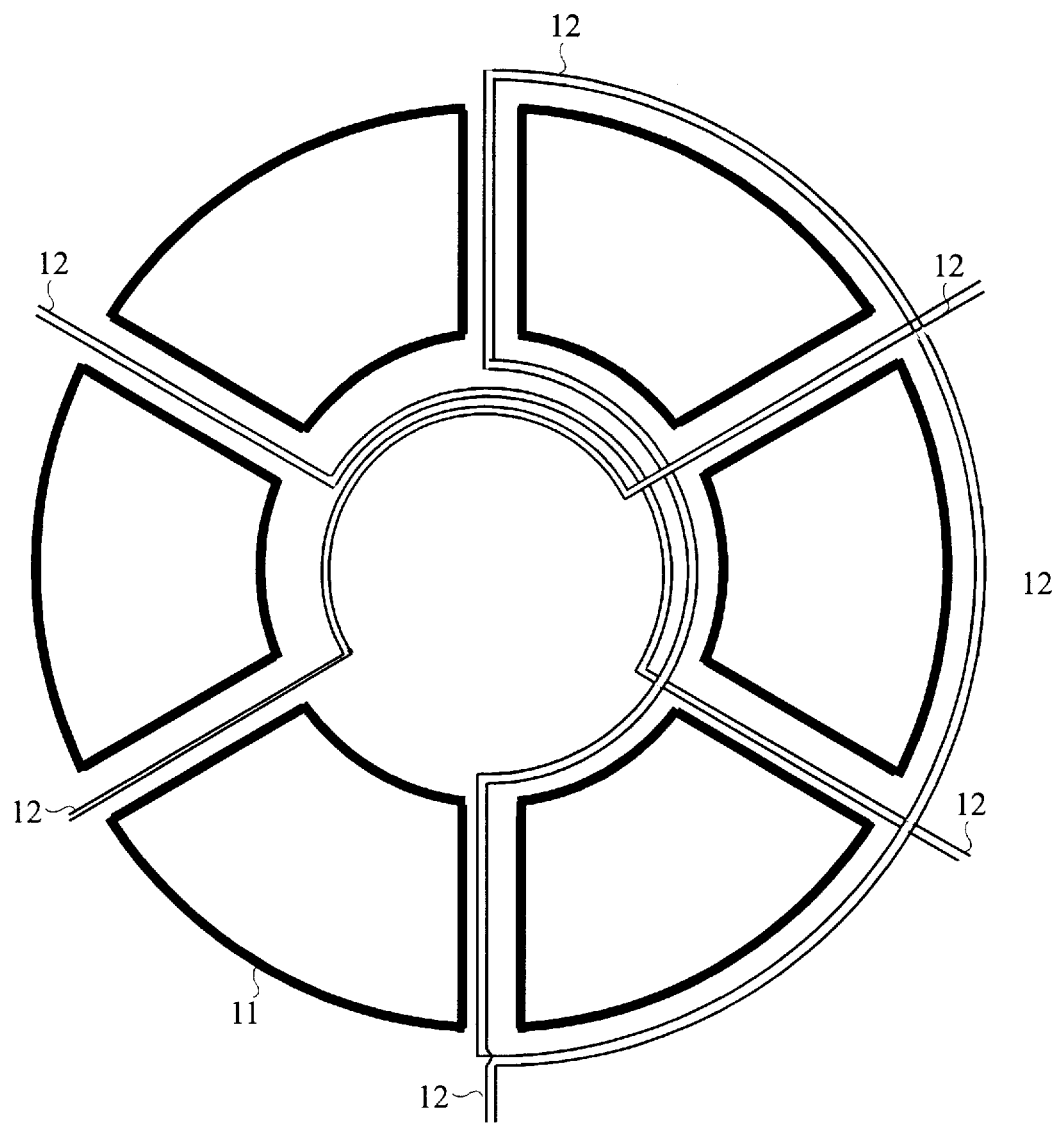
FIG. 9 is a perspective view of the precise electrical connectivity of the stator windings.

As is common in the art, the precise electrical configuration of said stator 11 is portrayed as in FIG. 9. This representation is a perspective view from the center of one of the open faces of the cylinder defined by said stator 11. In this representation, the inner and outer circles represent the ends of the stator, whilst the radial gaps represent the stator slots. Said windings 12 may be represented by lines which pass along the edges of the inner or outer circles, and which pass through said radial gaps. Conventional electronic schematic symbology is used.

As may be seen in FIG. 9, said windings 12 are concentrated, meaning that each winding half is located in a single rotor slot. This is in strong contrast to the distributed windings used in conventional three phase machines. In such machines, windings consist of several coils in adjacent slots, said coils joined in series to form an individual electrical unit. As may also be seen in FIG. 9, said windings 12 are not chorded, meaning that the circumferential distance between the two halves of winding 12 is precisely the circumferential distance between poles. This is in strong contract to the chorded windings of conventional three phase machines, wherein winding halves are placed closer together in order to reduce spatial harmonics. Finally, it may be seen that each said winding 12 is provided with an external connection, again as contrasted to a three phase machine wherein three terminals are brought out. Thus it may be seen that said stator may be considered to be a modified version of a conventional three phase stator.

The operation of said high phase order synchronous generator seen in FIG. 8 is as follows. Said rotor 15 is caused to rotate, thereby causing said magnetic field 19 to rotate. Said rotation of said magnetic field 19 causes the magnetic flux linked by said windings 12 to vary in a continuous fashion. Said changing flux linkage induces voltage in said windings 12, thereby producing the output of said generator. As such, the operation of the present generator is completely analogous to the operation of a conventional three phase synchronous generator.

Figure 10:
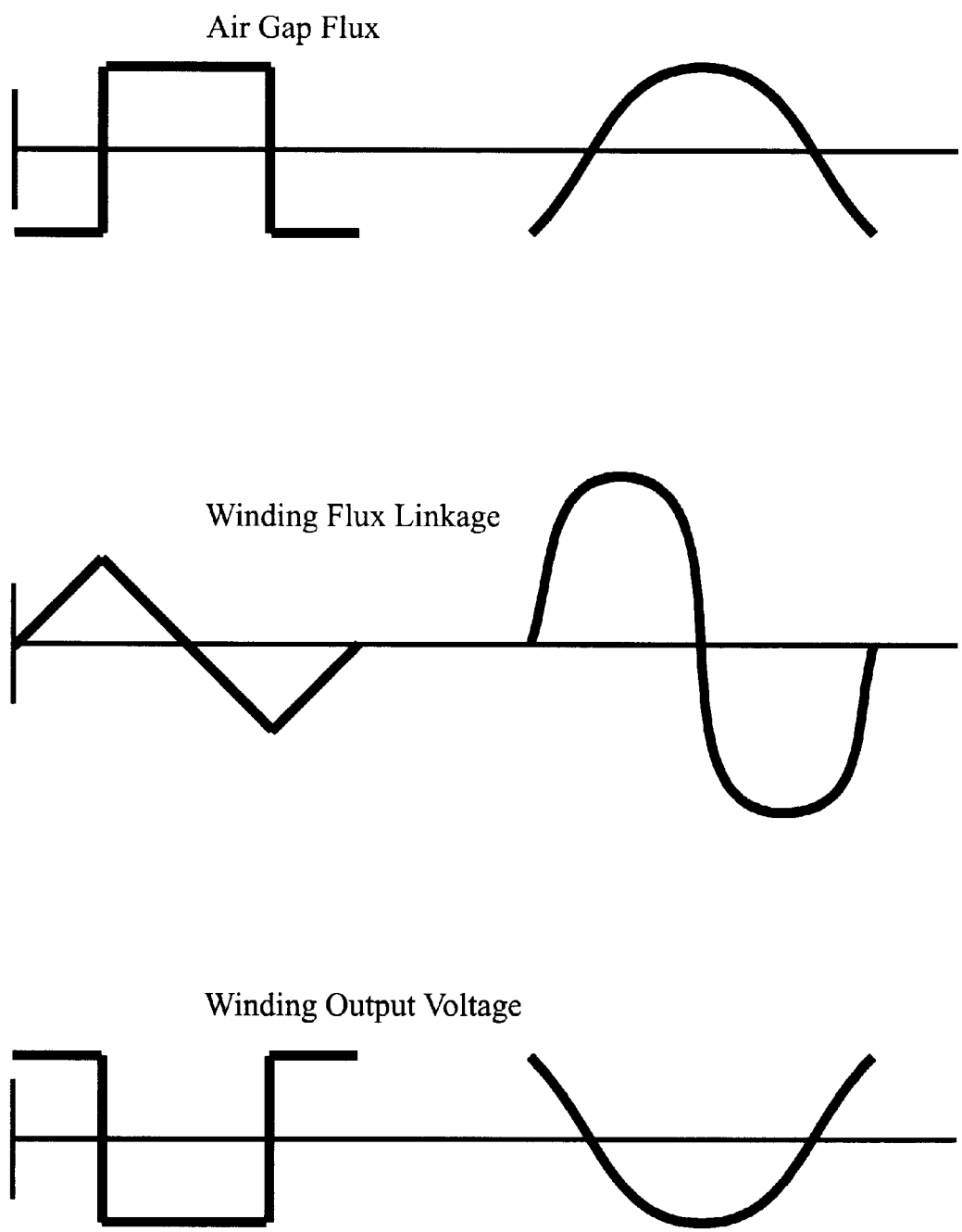
FIG. 10 is a developed representation of the magnet flux structure produced by the rotor.

With reference to FIG. 10 we see representations of several possible structures of said magnetic field 19 produced by said rotor 15. In this representation, the abscissa of each graph represents angular position about said rotor 15, whilst the ordinate of each graph represents the intensity of radial magnetic flux at said angular position. Such graphs are common in the art, and represent what is known as air gap flux. Below said graphs of magnetic flux, we see representations of magnetic flux linkage. This is the total of the magnetic flux which flows through a given stator winding 12, with the abscissa of each graph representing the position of said stator winding 12. Finally, we see graphs of the output voltage from said stator winding 12.

As may be seen, for symmetric flux air gap flux structures, the flux linked by a given said stator winding 12 bears the same relation to said structure of said magnetic field 19 as the integral of a function bears to said function. This means that the derivative of said flux linkage as said magnetic field 19 rotates is the same as said structure of said magnetic field 19, possibly altered by a scaling factor. The result of these relations is that as the waveform of the voltage output of said given stator winding 12 has the same general shape as said structure of said magnetic field 19. Thus any desired output waveform may be designed for.

Figure 11:
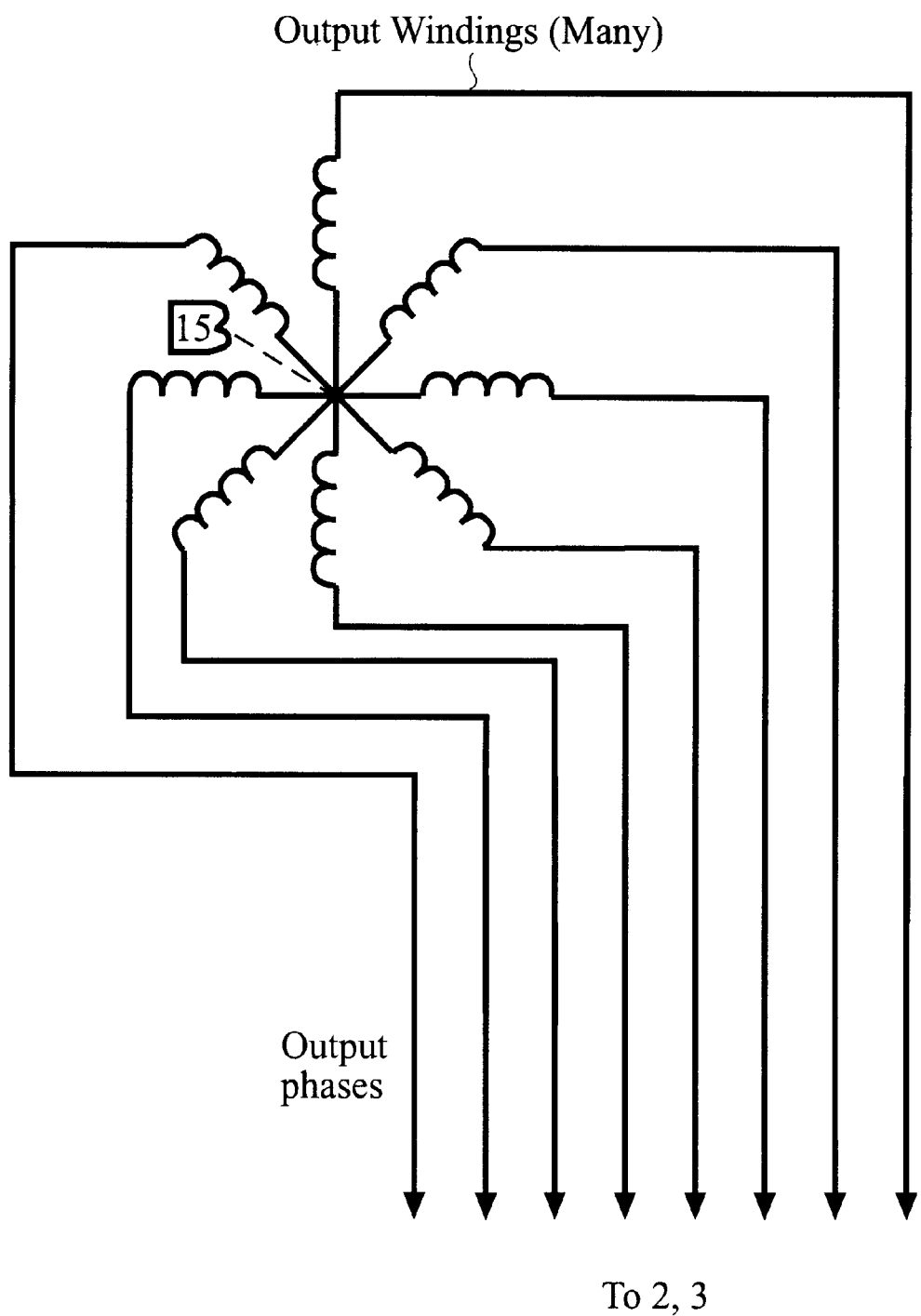
FIG. 11 is a schematic view of a high phase order induction generator.

With reference to FIG. 11, we see a representation of a high phase order induction generator. Said high phase order induction generator is a specific instance of high phase order generator 7. A stator 11 is wound with a plurality of windings 12. Said stator 11 is wound in the conventional fashion, with said windings 12 being composed of loops of insulated wire 13 placed in slots 14 in said stator 11. Said windings 12 may alternatively be composed of other conductive forms in place of insulated wire 13, for example a large machine might make use of insulated conductive bars, or form wound coils may be used. Such variation is common in the art of conventional machines. Said rotor 15 is positioned within said stator 11, supported by suitable bearing means so as to be held in position whilst being allowed to turn freely. Said bearing means generally consists of endbells, said endbells supporting ball bearing cartridges, said bearing cartridges supporting a shaft 18, said shaft 18 supporting said rotor 15.

Said stator 11, said rotor 15, said bearing means, said endbells and said shaft 18 are all common in the art. Standard variations, such as the use of thrust bearing means for support in axial loading conditions, water cooling, insulating materials, and the like are not disclosed as being common and well understood in the art. Additional fixtures may be associated with a rotating machine, such an mounting points or air vents. Said fixtures are also common in the art, and not disclosed herein.

Said rotor 15 produces a magnetic field 19. Said magnetic field 19 passes through said stator 11 as well as through the surface described by said windings 12. Said rotor 15 may be a squirrel cage rotor, as is common in the art. Alternatively, said rotor 15 may include said windings 20 and said slip rings for said production of magnetic field 19, as is common in the art.

As is common in the art, the precise electrical configuration of said stator 11 is portrayed as in FIG. 9 (It may be noted that the stator of the induction generator is generally similar to that of the synchronous generator). This representation is a perspective view from the center of one of the open faces of the cylinder defined by said stator 11. In this representation, the inner and outer circles represent the ends of the stator, whilst the radial gaps represent the stator slots. Said windings 12 may be represented by lines which pass along the edges of the inner or outer circles, and which pass through said radial gaps. Conventional electronic schematic symbology is used.

As may be seen in FIG. 9, said windings 12 are concentrated, meaning that each winding half is located in a single rotor slot. This is in strong contrast to the distributed windings used in conventional three phase machines. In such machines, windings consist of several coils in adjacent slots, said coils joined in series to form an individual electrical unit. As may also be seen in FIG. 9, said windings 12 are not chorded, meaning that the circumferential distance between the two halves of winding 12 is precisely the circumferential distance between poles. This is in strong contract to the chorded windings of conventional three phase machines, wherein winding halves are placed closer together in order to reduce spatial harmonics. Finally, it may be seen that each said winding 12 is provided with an external connection, again as contrasted to a three phase machine wherein three terminals are brought out. Thus it may be seen that said stator 11 may be considered to be a modified version of a conventional three phase stator.

The operation of said high phase order induction generator seen in FIG. 11 is as follows. Said rotor 15 is caused to rotate, thereby causing said magnetic field 19 to rotate. Said rotation of said magnetic field 19 causes the magnetic flux linked by said windings 12 to vary in a continuous fashion. Said changing flux linkage induces voltage in said windings 12, thereby producing the output of said generator.

Excitation of current said rotor 15 for the production of said magnetic field 19 is provided by induction from current flowing in said windings 12 in said stator 11, in the fashion of a conventional three phase induction generator. The use of induction excitation necessitates that said current flowing in said windings 12 in said stator 11 must include some amount of current flow which is in quadrature to the voltages induced in the stator.

As is common in the three phase induction generator, this quadrature current may be carried as reactive power in the output, said reactive power component being produced by said switching matrix 2 under control of said control system 4. Thus a high phase order induction generator operated using the present embodiment is completely analogous to the operation of an conventional three phase induction generator.

Figure 12:
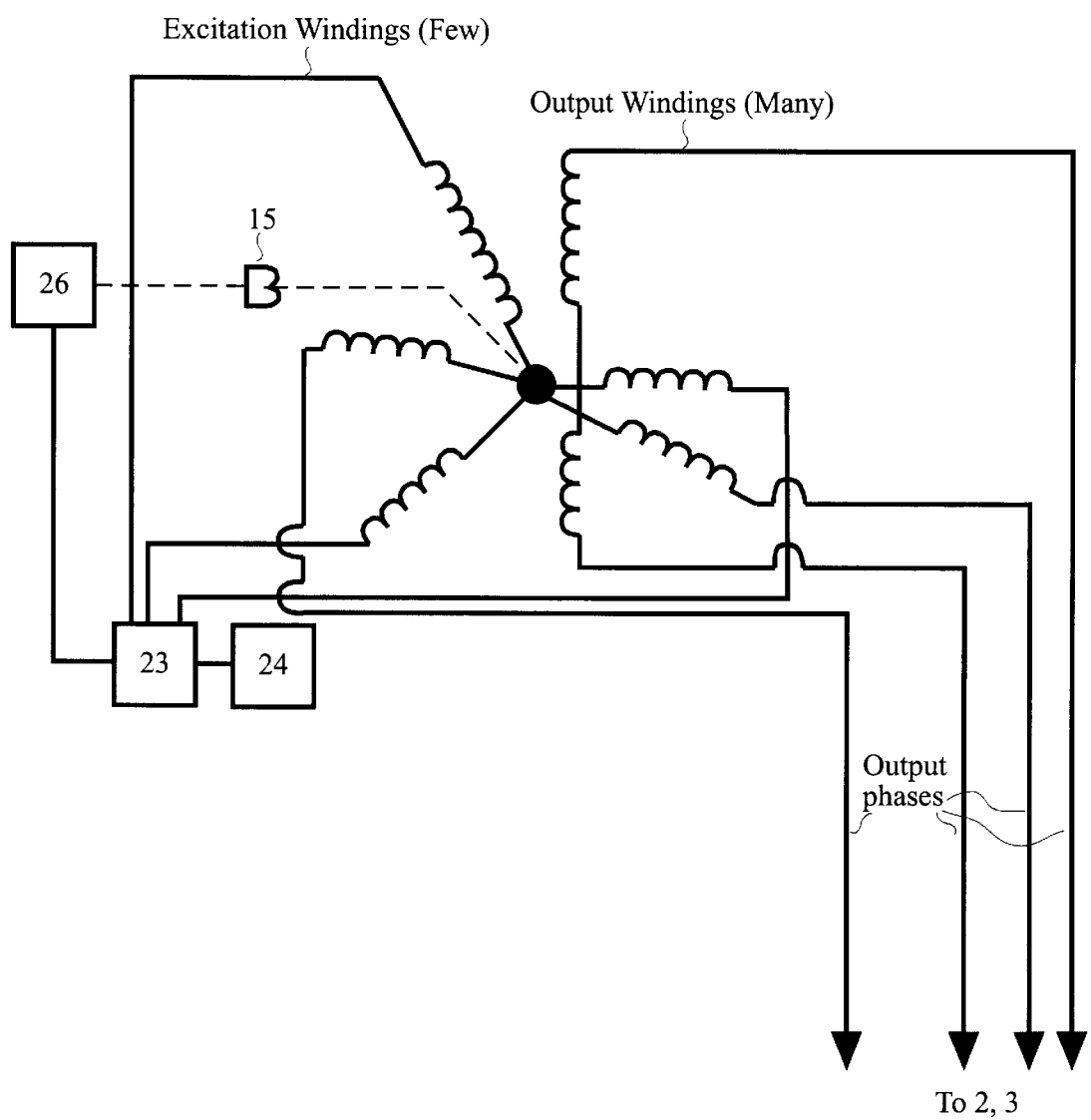
FIG. 12 is a schematic view of a high phase order induction generator, using independent excitation.

In a novel mode of operation, specifically enabled through the use of high phase order components, excitation may be provided to a subset of said windings 12 in said stator 11. With reference to FIG. 12 we see a schematic representation of an externally excited high phase order induction generator. Said high phase order induction generator is connected to a switching matrix 2 and thence to a load 3, as described for said high phase order induction generator above. The construction of said externally excited high phase order induction generator is not materially different from that of said high phase order induction generator, and is not repeated. The present mode of invention differs only in external connection and operation, described presently.

With reference to FIG. 12, as subset of said windings 12 in said stator 11 of said high phase order generator 7 are connected to a source of alternating current 23. Said source of alternating current 23 will generally be an inverter of the conventional type well known in the art, controlled by appropriate controller means 24 for the specification of voltage, current, phase, and frequency, again as is well known in the art. Said controller means 24 may include a rotor position transducer 26 connected to said rotor 15. Further, said controller means 24 may include voltage transducer means for the determination of generator output voltage, frequency, or phase.

The operation of said externally excited high phase order induction generator is as follows. Said rotor 15 is caused to rotate by the action of a prime mover 9. Said controller means 24 commands said source of alternating current 23 to produce current in quadrature to the desired output voltage. Said quadrature current will be of a frequency defined by that of the rotation of said rotor 15, reduced by several percent to account for slip. Said quadrature current in said stator 11 produces by induction a current in said rotor 15, thereby producing a magnetic field 19. Said magnetic field 19 rotates in response to the rotation of rotor 15. Said rotation of said magnetic field 19 causes the magnetic flux linked by said windings 12 to vary in a continuous fashion. Said changing flux linkage induces voltage in said windings 12, thereby producing the output of said generator. The frequency, magnitude, and phase of said quadrature current may be adjusted to regulate output frequency, voltage, and power factor, thereby allowing for much of the flexibility of output found in the synchronous generator, while eliminating the rotating brush contacts found necessary in such conventional synchronous generators.

Figure 13:
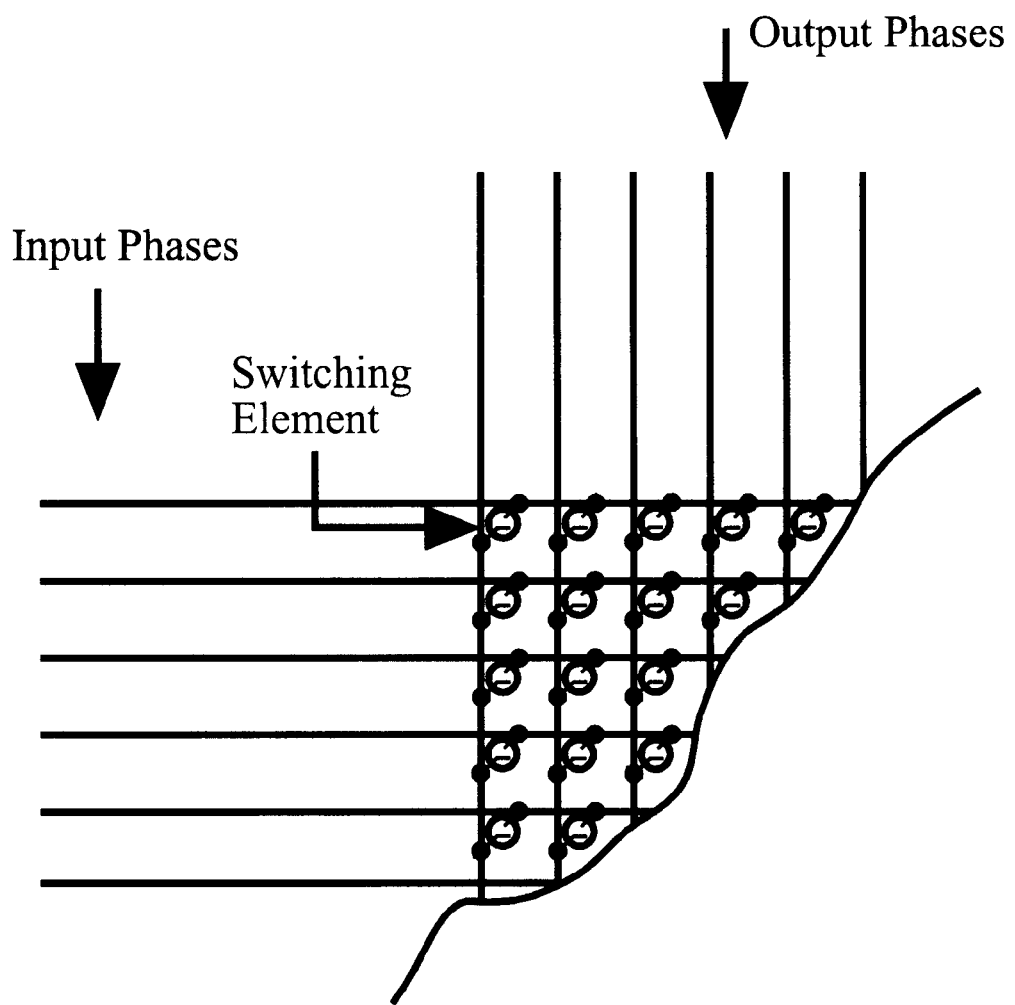
FIG. 13 is a schematic representation of a switching matrix used as a cycloconverter.
Figure 14:
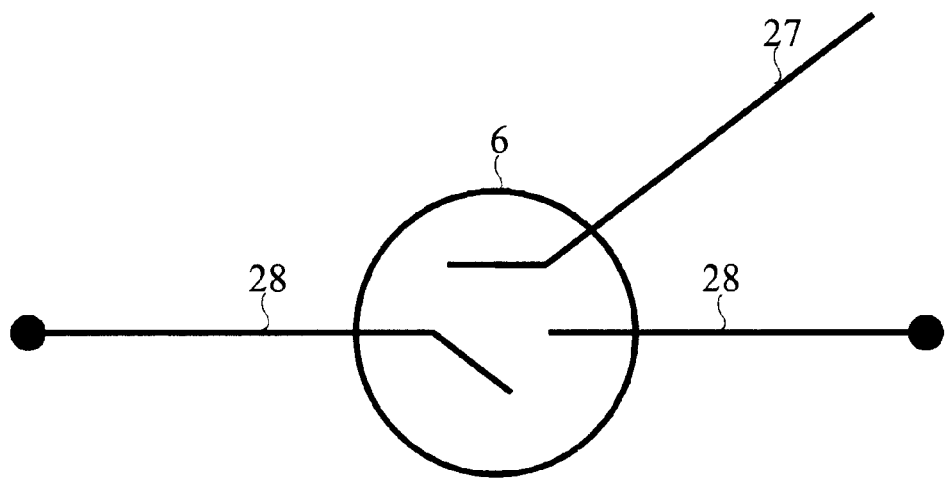
FIG. 14 represents the switching elements used in said switching matrix.
Figure 14:
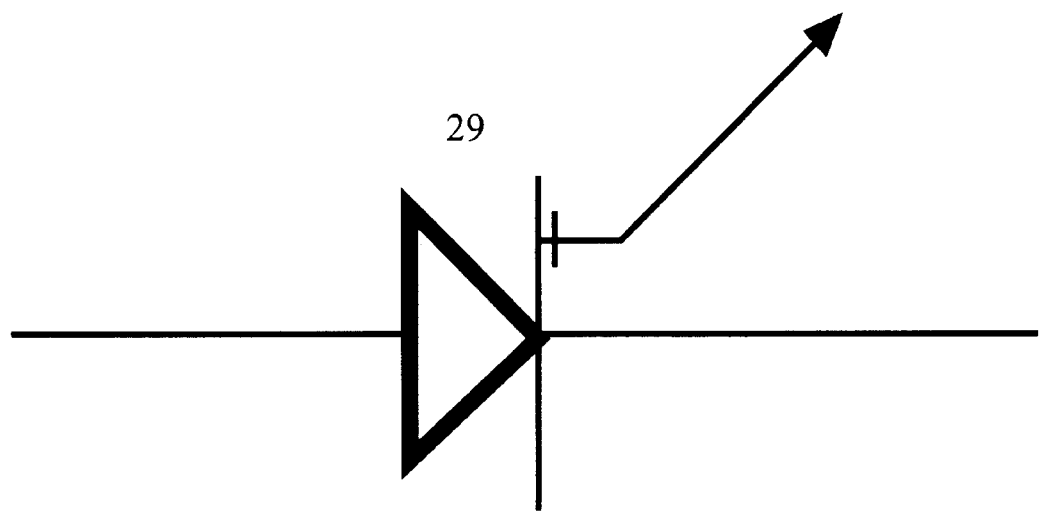

With reference to FIG. 13, said switching matrix 2 is composed of said switching elements 6 arranged in an array which enables each input phase to be connected to each output phase. With reference to FIG. 14, said switching elements 6 are conceptually three terminal devices, with a gate terminal 27 controlling the electrical connectivity between two power terminals 28. A particularly attractive device to use for said switching elements 6 is the silicon controlled rectifier or SCR, shown as power switch 29. The SCR is essentially a pair of transistors arranged to be self-biasing. In use, the SCR may be though of as a gated diode. The SCR is incapable of conducting current in one direction. In the other direction, the SCR remains in a non-conducting state until 'fired' by an pulse of current between gate and cathode. Once fired, the SCR will continue to conduct, even after the removal of the gate current. The only way to commutate an SCR is to externally stop the load current from flowing. Once said current flow is halted, the SCR will reset to its non-conducting state.

A triac is essentially a pair of SCRs arranged so that one or the other of the pair is capable of carrying an alternating current. Yet another device which may be used for the switch is the mos-controlled-thyristor or MCT. The MCT is similar in operation to the SCR, however the gate is insulated, and the triggering is via voltage pulse rather than current pulse. Still other switching devices may be used, and many such devices are well known in the art. Further, the details of three phase cycloconverters in general are well known in the art. Any switching device or control method which finds use in three phase cycloconverting systems may be use in high phase order cycloconverting systems.

SUMMARY, RAMIFICATIONS, AND SCOPE

The above is a description of a high phase order cycloconverting generator and inverter drive means. While this description includes many specificities, these should not be construed as limiting the scope of the invention in any way. For example, the diesel engine mentioned in the diesel/electric drive means may be replaced with another heat engine, for example, an Otto cycle engine. Power electronic devices for the switching matrix are not limited to those listed, but may include any power electronic switches including gas discharge devices, mechanical switches, silicon devices, and vacuum microelectronic devices. The present invention is especially capable of using switching devices considered too slow for other use. The present invention is not limited to a single type of output, for example, a single HPO generator could power several cycloconverters, each providing independent output, or a single cycloconverter could, depending upon control system features, split its output amongst several types of output.

For example, a 12 phase output cycloconverter could operate to produce independent 9 phase and 3 phase output, depending upon controller capabilities. A single HPO generator could provide output for several motors, as, for example, in a mining truck, where each wheel is independently powered. While systems will commonly be designed with equally-spaced phases, this is not necessary. Irregular spacing of phases may be advantageously used in order to reduce audible effects of machine operation, e.g., in noise-sensitive environments. While the motors and generators portrayed were of the conventional radial flux design, wherein the rotor is within the stator and the air gap magnetic flux flows radially to the axis of rotation, other geometries are well known and possible, for example, axial flux designs or rotor-outside designs. Rotor and stator need not be composed of ferromagnetic materials, and if the conductors are properly supported, so-called "air core" designs may be used. For large, low-voltage devices, single inductors filling entire slots, but not forming coils, may be used. These may be thought of as half-turn windings. Still other variations are possible. Accordingly, the scope of the invention should be determined not by the embodiment illustrated, but by the appended claims and their legal equivalents.

I claim:

1. An apparatus for the production of electrical power from mechanical power comprising:
    (a) generator means for conversion of said mechanical power into a polyphase alternating current,
    (b) cycloconverter means for conversion of said polyphase alternating current into desired output current, and
    (c) suitable wiring means for electrical connection of said components,
said apparatus connected to an electrical load, the improvement wherein being said polyphase alternating current having four or more phases.

2. Apparatus described in claim 1 wherein said polyphase alternating current having four or more phases is a polyphase alternating current having twelve or more phases.

3. Apparatus described in claim 1 wherein said generator means is a synchronous generator, a stator winding of said synchronous generator being wound to provide four or more phases of said alternating current.

4. Apparatus described in claim 3 wherein said stator wound to provide four or more phases of said intermediate alternating current is a stator comprising full span concentrated windings arranged to provide twelve or more phases of alternating current.

5. Apparatus described in claim 1 wherein said generator means is an induction generator, a stator winding of said induction generator being wound to provide four or more phases of alternating current.

6. Apparatus described in claim 5 wherein said stator wound to provide four or more phases of intermediate alternating current is a stator comprising full span concentrated windings arranged to provide twelve or more phases of alternating current.

7. Apparatus described in claim 1 wherein said polyphase alternating current has a sinusoidal waveform.

8. Apparatus described in claim 1 wherein said polyphase alternating current has a non-sinusoidal waveform.

9. Apparatus described in claim 1 wherein said polyphase alternating current is described by equal phase angle between phases.

10. Apparatus described in claim 1 wherein said polyphase alternating current is described by equal phase angle between phases.

11. Apparatus described in claim 1 wherein said output current produced by said cycloconverter means is a single phase alternating current.

12. Apparatus described in claim 1 wherein said output current produced by said cycloconverter means is a direct current.

13. Apparatus described in claim 1 wherein said output current produced by said cycloconverter means is of a plurality of phases.

14. Apparatus described in claim 13 wherein said output current is of four or more phases.

15. Apparatus described in claim 14 wherein said output current having four or more phases is a current having twelve or more phases.

16. Apparatus described in claim 1 wherein said cycloconverter means contains slow power switching devices.

17. Apparatus described in claim 1 wherein said cycloconverter means contain said power switching devices operated so as to switch at zero crossing of input waveform, whereby entire cycles or half cycles of input current are switched to the output, and no current flows through the switch element during the switching operation.

18. Apparatus described in claim 1 wherein said mechanical power is of an irregular frequency.

19. Apparatus described in claim 18 wherein said load is a constant frequency load.

20. Apparatus described in claim 1 wherein rotor and stator of said generator means are composed of materials which are not ferromagnetic.

21. Apparatus described in claim 1 wherein said polyphase alternating current is of twelve or more phases.

22. An electric drive comprising:
   (a) generator means for conversion of mechanical power into polyphase alternating current,
   (b) cycloconverter means for conversion of said polyphase alternating current into desired motor drive current,
   (c) electric motor means for conversion of said motor drive current into desired mechanical power, and
   (d) suitable wiring means for electrical connection of said components,
said apparatus driven by said mechanical power,
said apparatus providing mechanical power to a mechanical load, the improvement wherein being said polyphase alternating current and said motor drive current having four or more phases.

23. Apparatus described in claim 22 wherein said polyphase alternating current having four or more phases is a polyphase alternating current having twelve or more phases.

24. Apparatus described in claim 22 wherein said motor drive current having four or more phases is a polyphase alternating current having twelve or more phases.

25. A method for producing an electrical output of controlled variable frequency and voltage, comprising:
   a) driving a high phase number generator with suitable mechanical power, to generate a polyphase alternating current of four or more phases,
   b) transferring said polyphase alternating current from said generator to a cycloconverter by suitable wiring means for carriage of electrical current,
   c) converting said polyphase alternating current via said cycloconverter to produce said electrical output of arbitrary frequency and voltage, and
   d) employing said electrical output for driving a load.

26. A method as in claim 25 wherein said load is a motor operating on four or more phases, said cycloconverter being suitable wired for the production of a suitable number of phases.

\* \* \* \* \*

EX PARTE REEXAMINATION CERTIFICATE (7817th)
United States Patent
Edelson

(10) Number: US 6,198,238 C1
(45) Certificate Issued: Oct. 19, 2010

(54) HIGH PHASE ORDER CYCLOCONVERTING GENERATOR AND DRIVE MEANS

(75) Inventor: Jonathan S. Edelson, Princeton, NJ (US)

(73) Assignee: Borealis Technical Limited, Horse Barrack Lane (GI)

Reexamination Request:
No. 90/008,560, Mar. 28, 2007

Reexamination Certificate for:
Patent No.: 6,198,238
Issued: Mar. 6, 2001
Appl. No.: 08/568,541
Filed: Dec. 7, 1995

(51) Int. Cl.
*H02K 3/28* (2006.01)
*H02K 19/16* (2006.01)
*H02K 19/26* (2006.01)
*H02K 19/34* (2006.01)
*H02M 5/27* (2006.01)
*H02M 5/02* (2006.01)
*H02P 9/04* (2006.01)

(52) U.S. Cl. .................. 318/148; 363/170; 363/175
(58) Field of Classification Search .................. None See application file for complete search history.

(56) References Cited

U.S. PATENT DOCUMENTS

| | | | | |
|---|---|---|---|---|
| 3,431,483 A | | 3/1969 | Lafuze | 321/7 |
| 3,829,758 A | * | 8/1974 | Studtmann | 322/28 |
| 4,573,003 A | | 2/1986 | Lipo | 318/722 |
| 4,710,660 A | | 12/1987 | McKee et al. | 310/178 |

FOREIGN PATENT DOCUMENTS

CH 643 694 6/1984 .................. 17/30

* cited by examiner

*Primary Examiner*—Albert J Gagliardi

(57) ABSTRACT

An electrical generator, consisting of a high phase order generator and a high phase order cycloconverter. Output from said cycloconverter may be high phase order, three phase, single phase, or direct current. Output from said cycloconverter may be of arbitrary frequency, voltage, and phase.

Power electronic components are smaller and more efficiently used. Slower and therefor less expensive devices may be beneficially used. Variable speed resources may be used without the use of a DC to DC converter, enhancing power production efficiency.

In a beneficial embodiment of the present invention, said cycloconverter is used to provide power directly to a high phase order motor, whereby diesel electric drive means may be constructed to higher specific power and higher efficiency.

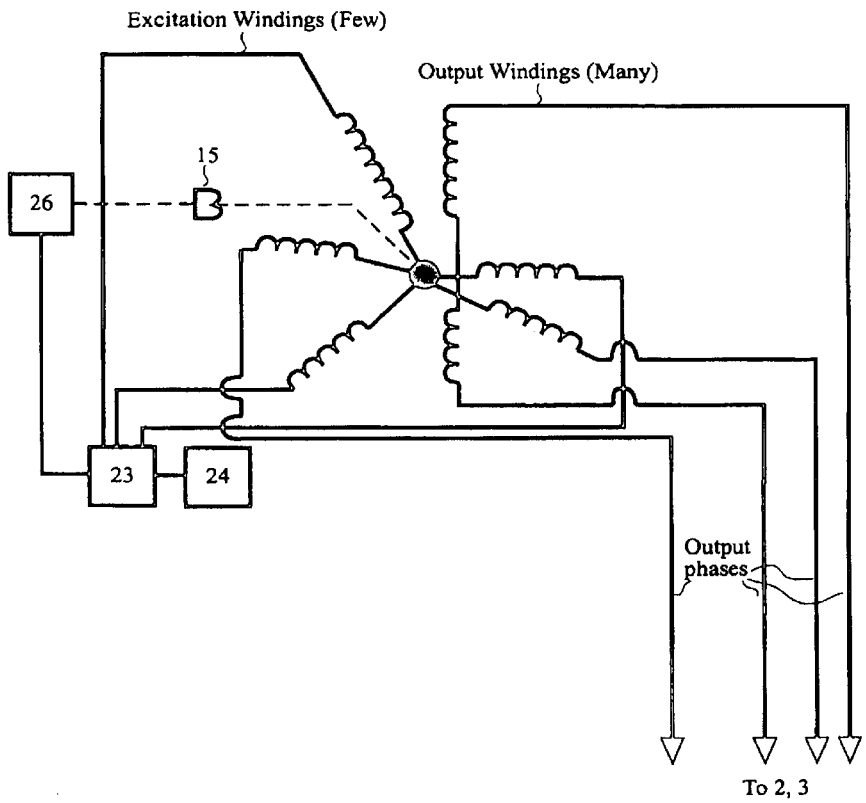

US 6,198,238 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3-6, 10 and 21-26 are cancelled.

Claims 1, 15 and 17 are determined to be patentable as amended.

Claims 2, 7-9, 11-14, 16, 18-19 and 20, dependent on an amended claim, are determined to be patentable.

New claims 27-38 are added and determined to be patentable.

1. An apparatus for the production of electrical power from mechanical power comprising:
   (a) generator means for conversion of said mechanical power into a polyphase alternating current, *said polyphase alternating current having four or more phases, said generator means comprising a stator and a rotor,*
   (b) cycloconverter means for conversion of said polyphase alternating current into desired output current, and
   (c) suitable wiring means for electrical connection of said components, *of said apparatus,*
   said apparatus *being* connected to an electrical load, [the improvement] wherein [being said polyphase alternating current having four or more phases] *said stator comprise full span concentrated windings, and wherein said generator means is an induction generator, said full span concentrated windings of said induction generator providing said four or more phases of alternating current;*
      *wherein said stator comprises full span concentrated excitation windings fed by a source of quadrature current able to excite the rotor to produce a magnetic field;*
      *whereby rotation of the rotor induces current in the full span concentrated windings.*

15. Apparatus described in claim [14] *13* wherein said output current [having four or more phases] is [a current having] *of* twelve or more phases.

17. Apparatus described in claim [1] *16* wherein said cycloconverter means contain said power switching devices operated so as to switch at zero crossing of input waveform, whereby entire cycles or half cycles of input current are switched to the output, and no current flows through [the switch element] *said power switching devices* during the switching operation.

27. *Apparatus described in claim 8 wherein said output current produced by said cycloconverter means is a direct current.*

28. *Apparatus described in claim 8 wherein said output current produced by said cycloconverter means is of a plurality of phases.*

29. *Apparatus described in claim 28 wherein said output current is of four or more phases.*

30. *Apparatus described in claim 29 wherein said output current is of twelve or more phases.*

31. *An apparatus for the production of electrical power from mechanical power comprising:*
   (a) *generator means for conversion of said mechanical power into a polyphase alternating current, said polyphase alternating current having four or more phases, said generator means comprising a stator and a rotor*
   (b) *cycloconverter means for conversion of said polyphase alternating current into desired output current, and*
   (c) *suitable wiring means for electrical connection of said components of said apparatus, said apparatus being connected to an electrical load, wherein said stator comprises full span concentrated windings, and wherein said generator means is an induction generator, said full span concentrated windings of said induction generator providing four or more phases of alternating current,*
   *wherein said stator comprises full span concentrated excitation windings fed by a source of quadrature current able to excite the rotor to produce a magnetic field;*
   *whereby rotation of the rotor induces current in the full span concentrated windings,*
   *and wherein said polyphase alternating current has a non-sinusoidal waveform.*

32. *Apparatus described in claim 31 wherein said output current produced by said cycloconverter means is a direct current.*

33. *Apparatus described in claim 31 wherein said output current produced by said cycloconverter means is of a plurality of phases.*

34. *Apparatus described in claim 33 wherein said output current is of four or more phases.*

35. *Apparatus described in claim 34 wherein said output current is of twelve or more phases.*

36. *An apparatus for the production of electrical power from mechanical power comprising:*
   (a) *generator means for conversion of said mechanical power into a polyphase alternating current, said polyphase alternating current having four or more phases, said generator means comprising a stator and a rotor*
   (b) *cycloconverter means for conversion of said polyphase alternating current into desired output current, and*
   (c) *suitable wiring means for electrical connection of said components of said apparatus, said apparatus being connected to an electrical load, wherein said stator comprises full span concentrated windings, and wherein said generator means is an induction generator, said full span concentrated windings of said induction generator providing four or more phases of alternating current,*
   *wherein said stator comprises full span concentrated excitation windings fed by a source of quadrature current able to excite the rotor to produce a magnetic field;*
   *whereby rotation of the rotor induces current in the full span concentrated windings,*
   *and wherein said output current is a direct current.*

37. *An apparatus for the production of electrical power from mechanical power comprising:*
   (a) *generator means for conversion of said mechanical power into a polyphase alternating current, said* polyphase alternating current having four or more phases, said generator means comprising a stator and a rotor, (b) cycloconverter means for conversion of said polyphase alternating current into desired output current, and (c) suitable wiring means for electrical connection of said components of said apparatus, said apparatus being connected to an electrical load, wherein said stator comprises full span concentrated windings, and wherein said generator means is an induction generator, said full span concentrated windings of said induction generator providing four or more phases of alternating current, wherein said stator comprises full span concentrated excitation windings fed by a source of quadrature current able to excite the rotor to produce a magnetic field;

whereby rotation of the rotor induces current in the full span concentrated windings, and wherein said output current has four or more phases.

38. Apparatus described in claim 37 wherein said output current is of twelve or more phases.

* * * * *